Jan. 11, 1966     E. W. DESAULNIERS ETAL     3,228,216

PHOTOFLASH LAMP

Filed May 29, 1963

LESTER F. ANDERSON
EUGENE W. DESAULNIERS
                  INVENTORS

BY Joseph C. Ryan

ATTORNEY ns # United States Patent Office 3,228,216
Patented Jan. 11, 1966

3,228,216
PHOTOFLASH LAMP
Eugene W. Desaulniers and Lester F. Anderson, Williamsport, Pa., assignors to Sylvania Electric Products Inc., a corporation of Delaware
Filed May 29, 1963, Ser. No. 284,063
8 Claims. (Cl. 67—31)

This invention relates to the manufacture of photoflash lamps and more particularly to miniature photoflash lamps designed particularly for use with miniature cameras employing automatic exposure control devices.

Over the years since the use of flashlamps by amateur photographers became quite popular and a general practice, there has been a continuing effort exerted by the camera manufacturers to provide smaller and smaller cameras. Concurrently therewith, flashlamps manufacturers have been exterting a continuing effort to provide smaller and smaller flash-lamps giving more and more light output per unit envelope volume. One of the most significant of these efforts was the commercial introduction in 1957 of a superatmospheric pressure photoflash lamp using zirconium as the combustible material. In one example of this new photoflash lamp, as described in U.S. Patent 3,067,601 which issued on December 11, 1962 to L. F. Anderson et al., it was pointed out that a lamp employing the zirconium-superatmospheric pressure system gave substantially the same amount of useful light as the popular Press 25 even though it was only about one-fourth the size of the Press 25. This breakthrough contributed significantly to further miniaturization efforts until today one of the most popular commercial photoflash lamps is the AG–1, a lamp employing the zirconium-superatmospheric system, and the volume of which is about 1.2 cc.

In recent years, in addition to reducing the size of cameras, camera manufacturers have been providing more and more cameras with some form of automatic exposure control which usually includes a photocell-operated shutter which controls either the aperture opening or the shutter closure by reflected light from the subject. Under relatively constant illumination conditions, such as daylight for example, good pictures are readily obtainable with cameras having automatic exposure controls. However, such is not the case when highly transient light sources, such as presently-available commercial photoflash lamps of a size compatible with the size of the small cameras, are employed because the rate of change in light output during the illumination life of these lamps is too great in relationship to the time required for detection of the quantity of reflected light and actuation of a shutter or aperture mechanism in response thereto.

The majority of the commercial photoflash lamps on the market today employ the zirconium-superatmospheric pressure system in small lamp envelopes, i.e., envelopes having an internal volume of less than about 7 cc. because of the significant advantages which they have over the lamps used previously which employed the aluminum-subatmospheric pressure system in vessels having an internal volume of more than about 7 cc.

In view of the foregoing, one of the principal objects of this invention is to provide a miniature photoflash lamp having a high light output per unit envelope volume which can be employed as the light source with cameras having automatic exposure control so that exposure can be controlled by reflected light from the subject.

Another of the principal objects is to provide such a photoflash lamp which will insure substantially uniform exposures for close-up shots as well as moderate distance shots, i.e., from 4 to 16 feet.

To attain these objects, it is necessary that both the rate of rise in energy development be slow enough and the duration be long enough to permit both detection of reflected light and actuation of the shutter or aperture mechanism to be effective. Thus, the time to peak must be lengthened and the one-half peak duration must be extended. In addition, and even of greater importance for close-up shots, some means must be devised to effect a momentary interruption in energy development during the early part of the intensity vs. time characteristic of the flashlamp because, assuming similar subject reflectance, the close-up shot at 4 feet will need only $\frac{1}{16}$ the exposure of the shot at 16 feet. Unfortunately, due to a number of differences in the nature of the material, retardation of the combustion rate of zirconium foil cannot be accomplished in a manner similar to that employed with magnesium foil and aluminum foil.

The lamp of our invention comprises a substantially tubular envelope having an internal volume of substantially less than 7 cc., a filling of combustion-supporting gas at several atmospheres pressure, a charge of coarse shredded zirconium foil distributed throughout the upper portion of the lamp envelope, a charge of fine shredded zirconium foil located in the lower portion of the lamp envelope and disposed about the ignition system of the lamp, and a separator of inert material disposed within the lamp envelope between the two charges of foil and spaced from the inside wall of the lamp envelope.

In the accompanying drawing wherein a specific embodiment of the invention is illustrated, FIGURE 1 is a side elevational view of a photoflash lamp embodying the principles of this invention.

Figure 1:
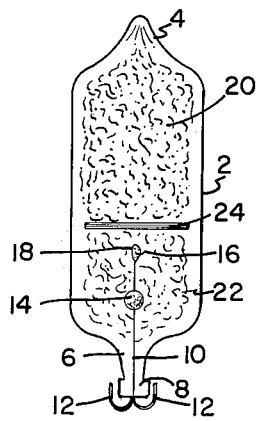
Figure 2:
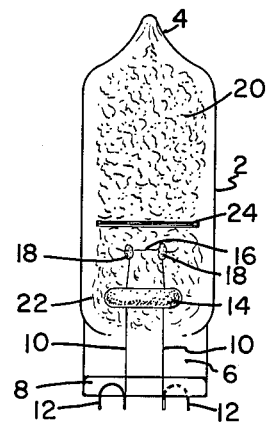
FIGURE 2 is a front elevational view thereof.

As illustrated in FIGURES 1 and 2, the lamp comprises a segment of drawn glass tubing 2, having an O.D. of about one-half inch and a wall thickness of at least about 25 mils and being about one and one-quarter inches in length. One end of the tubing 2 is defined by an exhaust tip 4 and the other end by a press 6 which terminates in a shoulder 8. A pair of lead-in wires 10 which comprise a portion of the lamp ignition system extend through the press 6 and are bent into the form of stirrups 12 lying along opposite sides of the shoulder 8. The segments of the lead-in wires disposed inside the tubing 2 are supported in spaced relationship with respect to one another by an insulator button 14. The ignition system, in addition to lead-in wires 10, comprises filament 16 and a body 18 of ignition paste on the inner end of each lead-in wire, the ignition paste being disposed in operative relationship with respect to the filament. The lamp is provided with a filling of combustion-supporting gas, such as oxygen for example, at a pressure of several atmospheres. In this specific example, the pressure is about 400 cms. of mercury. A charge of about 36 milligrams of coarse filamentary zirconium 20 is disposed in the upper portion of the tubing 2 and a charge of about 6 milligrams of fine filamentary zirconium 22 is disposed in the lower portion of the tubing 2 and disposed about the lamp ignition system. A mica wafer 24 is disposed between these two charges to separate them from one another. In this specific example, the unit cross-section of the coarse foil is about 0.0015 inch by 0.0025 inch whereas the fine foil is about 0.00095 inch by 0.001 inch. The mica wafer is about 0.015–0.020 inch thick.

Figure 3:
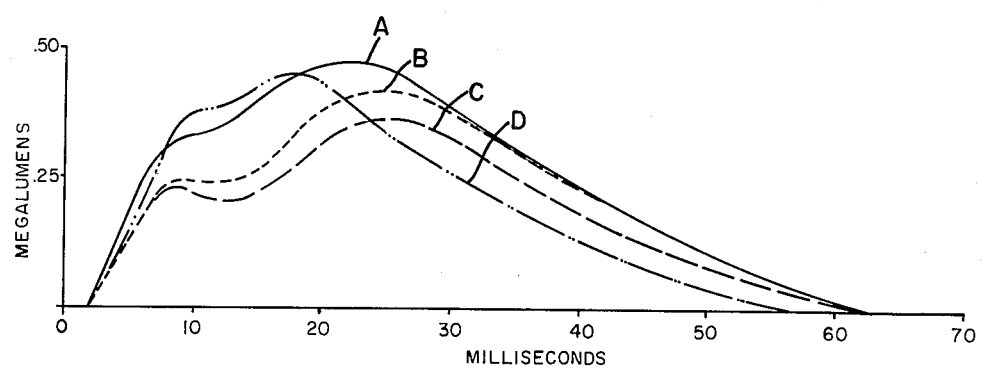
FIGURE 3 is a plot of light output in terms of magalumens with respect to time in terms of milliseconds illustrating the light distribution curves obtained with various lamp structure modifications relating to the separator of inert material.

Initially, applicants followed generally the teachings of the prior art with respect to focal plane photoflash lamps, i.e., a charge of coarse foil was distributed throughout the upper portion of the lamp envelope and a charge of fine foil was located in the lower portion of the lamp envelope and disposed about the ignition system of the lamp. When this foil distribution pattern was used in a zirconium-super-atmospheric pressure system, it was found that the system was not satisfactory, primarily because the energy development rate is too great for automatic shutter devices. The use of a shield of inert material completely separating the two foil charges also was found to be unsatisfactory because, quite surprisingly, the energy development is not retarded and the characteristic approaches that with no shield and at some sacrifice of prolongation. Despite these results, further efforts were made, employing the shielding concept, and it was found that the results obtained with partial shielding is substantially different than the results obtained with either no shielding or total shielding. The results obtained with 0%, 30%, 70% and 100% shielding is illustrated in FIG. 3 of the accompanying drawing wherein the several light distribution curves A, B, C and D respectively are delineated. The peak time and the one-half peak duration obtained in these tests are as follows:

| Percent Shield | Peak Time (msecs.) | One-half Peak Duration (msecs.) |
| --- | --- | --- |
| 0 | 21.4 | 33.8 |
| 30 | 25.1 | 36.4 |
| 70 | 25.2 | 37.6 |
| 100 | 19.9 | 29.0 |

Thus, as reflected in the foregoing table and in FIGURE 3 of the accompanying drawing, the time to peak is extended beyond 25 msecs. when partial shielding is employed, whereas with no shielding or complete shielding the time to peak is nearer to 20 msecs. Significantly, with partial shielding the one-half peak duration is about 37 msecs., whereas with no shielding or complete shielding the one-half peak duration is less than about 32 msecs.

The shield acts as both a physical and a convection barrier, thus regulating the combustion rate. The shield is preferably one through which at least part of the radiant energy from the ignited charge of fine foil may be transmitted to thereby ignite the charge of coarse foil. When the charge of coarse foil is ignited by radiation, the volume it occupies will be oxygen deficient and the combustion rate will be slowed down because of the time it takes for the combustion-supporting gas to flow back into this portion of the lamp envelope. It is during this period of time that an interruption occurs in the otherwise fairly steady rise of light energy output toward peak. This momentary pause for several milliseconds provides a substantially uniform quantity of light for a period of time long enough to permit detection of reflected light and actuation of a shutter or aperture mechanism to be effective thus insuring good quality close-up shots.

What we claim is:

1. A photoflash lamp comprising: a sealed, light-transmitting envelope; a combustion-supporting gas filling in said envelope at a pressure above atmospheric; two separate charges of filamentary zirconium disposed in said envelope; ignition means disposed in said envelope in operative relationship with respect to one of said charges of filamentary zirconium; and a separator of inert material disposed within said envelope between said two charges of filamentary zirconium and spaced from the inside wall of said envelope.

2. A photoflash lamp comprising: a substantially tubular, sealed, light-transmitting envelope having an upper portion and a lower portion; a combustion-supporting gas filling in said envelope at a pressure above atmospheric; a charge of relatively coarse filamentary zirconium disposed in said upper portion of said envelope; a charge of relatively fine filamentary zirconium disposed in said lower portion of said envelope; ignition means disposed in said envelope in operative relationship with respect to said charge of relatively fine filamentary zirconium; and a separator of inert material disposed within said envelope between said charge of relatively coarse filamentary zirconium and said charge of relatively fine filamentary zirconium and spaced from the inside wall of said envelope.

3. The combination of claim 2 in which the relatively coarse filamentary zirconium has a unit cross section of about 0.0015 inch by 0.0025 inch and the relatively fine filamentary zirconium has a unit cross section of about 0.00095 inch by about 0.001 inch.

4. The combination of claim 2 in which the separator is in the form of a disc, the diameter of which is between about 30% to about 70% of the inside diameter of the tubular envelope.

5. A photoflash lamp comprising: a sealed, light-transmitting envelope; a combustion-supporting gas filling in said envelope at a pressure above atmospheric; two separate charges of filamentary zirconium disposed in said envelope, one of said charges being several times greater than the other; ignition means disposed in said envelope in operative relationship with respect to the smaller of said two separate charges of filamentary zirconium; and a separator of inert material disposed within said envelope between said two charges of filamentary zirconium and spaced from the inside wall of said envelope.

6. The combination of claim 2 in which the charge of relatively coarse filamentary zirconium disposed in the upper portion of said envelope is several times greater than the charge of relatively fine filamentary zirconium disposed in said lower portion of said envelope.

7. The combination of claim 1 in which said separator of inert material transmits radiant energy.

8. The combination of claim 2 in which said separator of inert material transmits radiant energy.

References Cited by the Examiner

UNITED STATES PATENTS

| | | | |
| --- | --- | --- | --- |
| 374,592 | 5/1943 | Van Liempt et al. | 67—31 |
| 1,625,108 | 4/1927 | Vierkotter | 67—31 |
| 1,996,621 | 4/1935 | Kurlander | 67—31 |
| 2,142,372 | 1/1939 | Pipkin et al. | 67—31 |
| 2,191,402 | 2/1940 | Saffir et al. | 67—31 |
| 2,290,309 | 7/1942 | Aquilla | 67—31 |
| 2,305,609 | 12/1942 | Eaton | 67—31 |
| 3,046,769 | 7/1962 | Anderson et al. | 67—31 |

JAMES W. WESTHAVER, *Primary Examiner.*

EDWARD J. MICHAEL, *Examiner.*

M. L. BATES, *Assistant Examiner.*